G. SCHOCK.

Barrel Washer.

No. 9,259. Reissued June 15, 1880.

Witnesses:

A. V. Briesen

John G. Turnbridge

Inventor:

Gustav Schock by his attorney

A. V. Briesen

N. PETERS, PHOTO-LITHOGRAPHER, WASHINGTON, D. C.

UNITED STATES PATENT OFFICE.

GUSTAV SCHOCK, OF NEW YORK, N. Y.

BARREL-WASHER.

SPECIFICATION forming part of Reissued Letters Patent No. 9,259, dated June 15, 1880.

Original No. 173,422, dated February 15, 1876. Application for reissue filed April 8, 1879.

*To all whom it may concern:*

Be it known that I, GUSTAV SCHOCK, of the city of New York, county and State of New York, have invented a new and Improved Barrel-Washer, of which the following is a specification.

Figure 1:
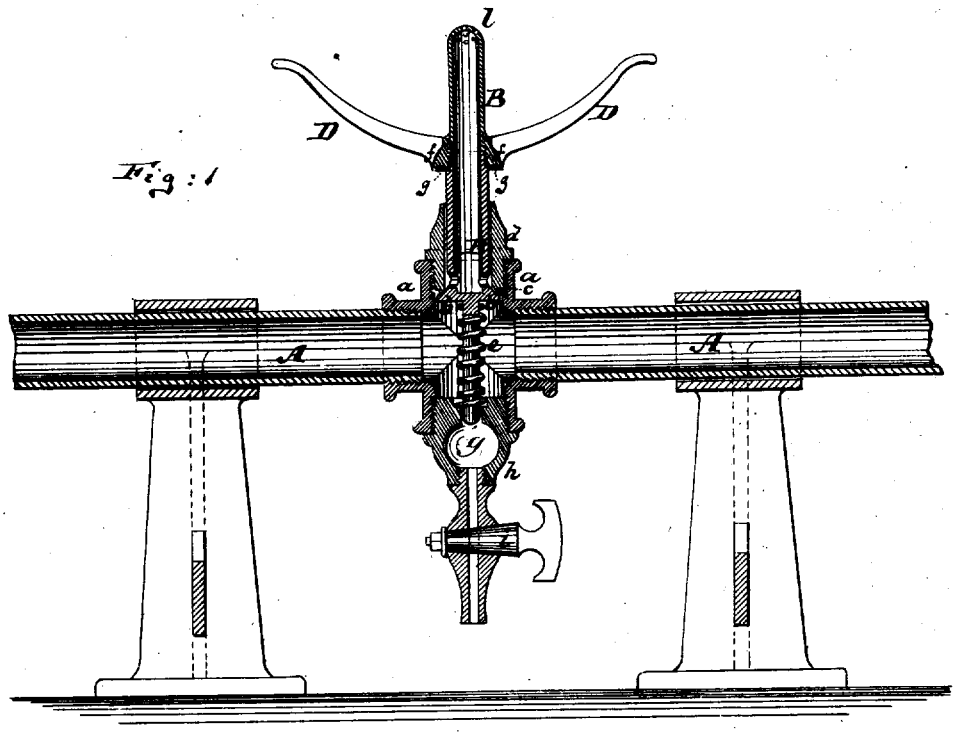
Figure 3:
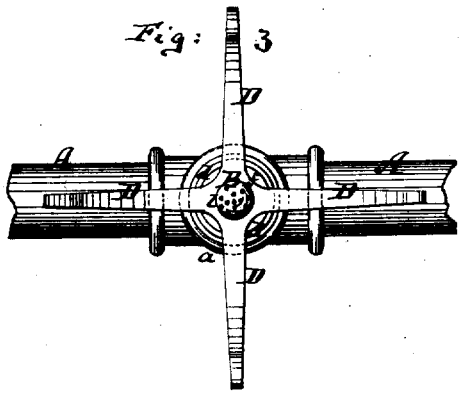
Figure 2:
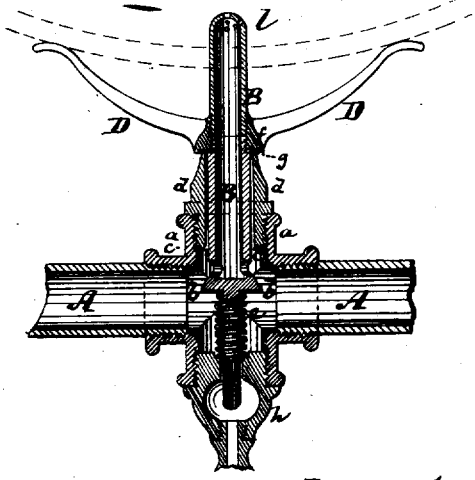

Figure 1 is a vertical central section of my improved barrel-washer, showing its valve closed. Fig. 2 is a similar view of the same, showing its valve open. Fig. 3 is a top view of the same.

Similar letters of reference indicate corresponding parts in all the figures.

This invention relates to a new barrel-washer in which the washing-pipe and the barrel-supports are rigidly united.

In the drawings, the letter A represents a horizontal supply-pipe for the water or other liquid which is used for washing the barrels or other vessels. This pipe is supported on a suitable frame-work, and has a vertical upwardly-projecting branch, *a*, at every place at which a barrel-washer is to be applied. Into every vertical branch *a* of the pipe A is fitted a vertically-movable pipe, B, which at its lower part carries an enlargement or valve, *b*, the pipe B being thus the valve-carrier.

The valve, by the pressure of the water, is held against an annular valve-seat, *c*. The seat *c* is formed in the branch *a*, or in a tube, *d*, that is or may be screwed into the same, as shown. A spring, *e*, may be applied against the closed lower end of the pipe B to insure the closing of the valve *b*. The pipe B extends loosely through the branch *a* and tube *d*, and projects above the same, and terminates at its upper end in a rose or sprinkler, *l*. Below this rose or sprinkler are attached to and rigidly connected with the pipe B two or more radially-projecting arms, D D, of equal length and equally spaced, as in Fig. 3, which arms constitute the barrel-support, and between which are open spaces into which the barrel can sink.

The pipe B is closed at its lower part, so that when the valve *b* is closed, as in Fig. 1, no liquid can enter said pipe B from the pipe A; but above the valve *b* the pipe B has an aperture or apertures, so that when a barrel is placed upon the brackets D D and the pipe B thereby slid down and the valve opened, as in Fig. 2, the liquid from the pipe A will enter the pipe B, and thereby also the barrel, which is so placed upon the brackets D that the pipe B will enter its bung-hole and wash it with the liquid that flows through such pipe. The pipe B has, above the branch *a* and tube *d*, an outer flange or shoulder, *f*, which at its under side carries a cushion, *g*, of lead, rubber, or other proper material, and which, by the weight of the barrel, is forced upon the upper end of the tube *d*, as in Fig. 2, to close the annular space between the pipe B and branch *a* and tube *d*, and counteract the tendency of the water to escape around the pipe B. Directly below the pipe B, I propose and prefer to attach to the pipe A a short downwardly-projecting pipe, *h*, having an upper enlargement or chamber, $g^{\times}$, the pipe *h* having a cock, *i*, for the purpose of allowing a small escape of water in winter and preventing freezing.

The chamber $g^{\times}$ also permits the application of a guide-rod, *j*, to the lower end of the sliding pipe B, as shown. This guide-rod traverses the pipe A and serves to steady the valve *b* and pipe B.

I claim as my invention—

1. In a barrel-washer, the combination of the washing-pipe B with the radial upwardly-projecting barrel-supports D D, all being of equal length and all rigidly attached to the pipe B, and disconnected at their outer ends, forming radial open spaces between said supports, substantially as herein shown and described.

2. The barrel-washer composed of the supply-pipe A *a* and the sliding pipe B, having rose on top, and forming a valve at its lower end, and which carries the radial upwardly-projecting barrel-supports D D, having radial open spaces between them, substantially as described.

3. The combination, in a barrel-washer, of the sliding perforated pipe B with the valve *b*, and with the valve-seat *c* above said valve, substantially as specified.

4. The combination of the sliding perforated pipe B, having arms D, with the shoulder *f*, and with the embracing-tube *d* or *a*, to constitute a valve when the pipe B is slid down, substantially as specified.

5. A barrel-support constructed of a series of equidistant upwardly-extending radial arms, D D, which are entirely disconnected except at their inner ends, where they are rigidly joined to the supply-pipe, which has its discharge-opening above the inner ends of said arms, substantially as herein shown and described.

GUSTAV SCHOCK.

Witnesses:
F. V. BRIESEN,
T. B. MOSHER.